(12) United States Patent
Kim

(10) Patent No.: US 7,636,705 B2
(45) Date of Patent: Dec. 22, 2009

(54) METHOD AND APPARATUS FOR SUPPORTING MOBILITY OF CONTENT BOOKMARK

(75) Inventor: Chang Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/571,411

(22) PCT Filed: Jun. 30, 2005

(86) PCT No.: PCT/KR2005/002056

§ 371 (c)(1),
(2), (4) Date: Jan. 11, 2008

(87) PCT Pub. No.: WO2006/004346

PCT Pub. Date: Jan. 12, 2006

(65) Prior Publication Data

US 2008/0250061 A1    Oct. 9, 2008

(30) Foreign Application Priority Data

Jun. 30, 2004    (KR) .................. 10-2004-0050693

(51) Int. Cl.
*G06F 7/00* (2006.01)
*G06F 17/00* (2006.01)
*G06F 17/30* (2006.01)
*G06F 12/00* (2006.01)

(52) U.S. Cl. ................. 707/1; 707/100; 707/104.1; 707/202

(58) Field of Classification Search ............. 707/103 R, 707/100, 102, 104.1, 1–3, 200, 202, 203
See application file for complete search history.

(56) References Cited

U.S. PATENT DOCUMENTS

| 2002/0054049 | A1* | 5/2002 | Toyoda et al. ............ 345/700 |
| 2002/0069218 | A1* | 6/2002 | Sull et al. ................ 707/501.1 |
| 2004/0152054 | A1* | 8/2004 | Gleissner et al. ......... 434/156 |
| 2004/0203621 | A1* | 10/2004 | Brown et al. ............. 455/412.1 |
| 2004/0223725 | A1* | 11/2004 | Koh et al. ................ 386/46 |
| 2005/0097623 | A1* | 5/2005 | Tecot et al. .............. 725/136 |
| 2005/0166258 | A1* | 7/2005 | Vasilevsky et al. ...... 725/138 |

FOREIGN PATENT DOCUMENTS

| KR | 20020025686 | 4/2002 |
| KR | 20030004926 | 1/2003 |
| KR | 20030095897 | 12/2003 |
| WO | 02080524 | 10/2002 |
| WO | 03067594 | 8/2003 |

* cited by examiner

*Primary Examiner*—Wilson Lee
*Assistant Examiner*—Merilyn P Nguyen
(74) *Attorney, Agent, or Firm*—Lee, Hong, Degerman, Kang & Waimey

(57) ABSTRACT

A method for playing a media object. The method includes storing bookmark information in a storage apparatus if a bookmark is set on a first media object, and playing a second media object from a position where the bookmark is set on the first media object according to the bookmark information stored in the storage apparatus, the second media object having content similar with the first media object, and a first media device to which the bookmark information was created with respect to being different from a second media device of the second media object.

16 Claims, 5 Drawing Sheets

301

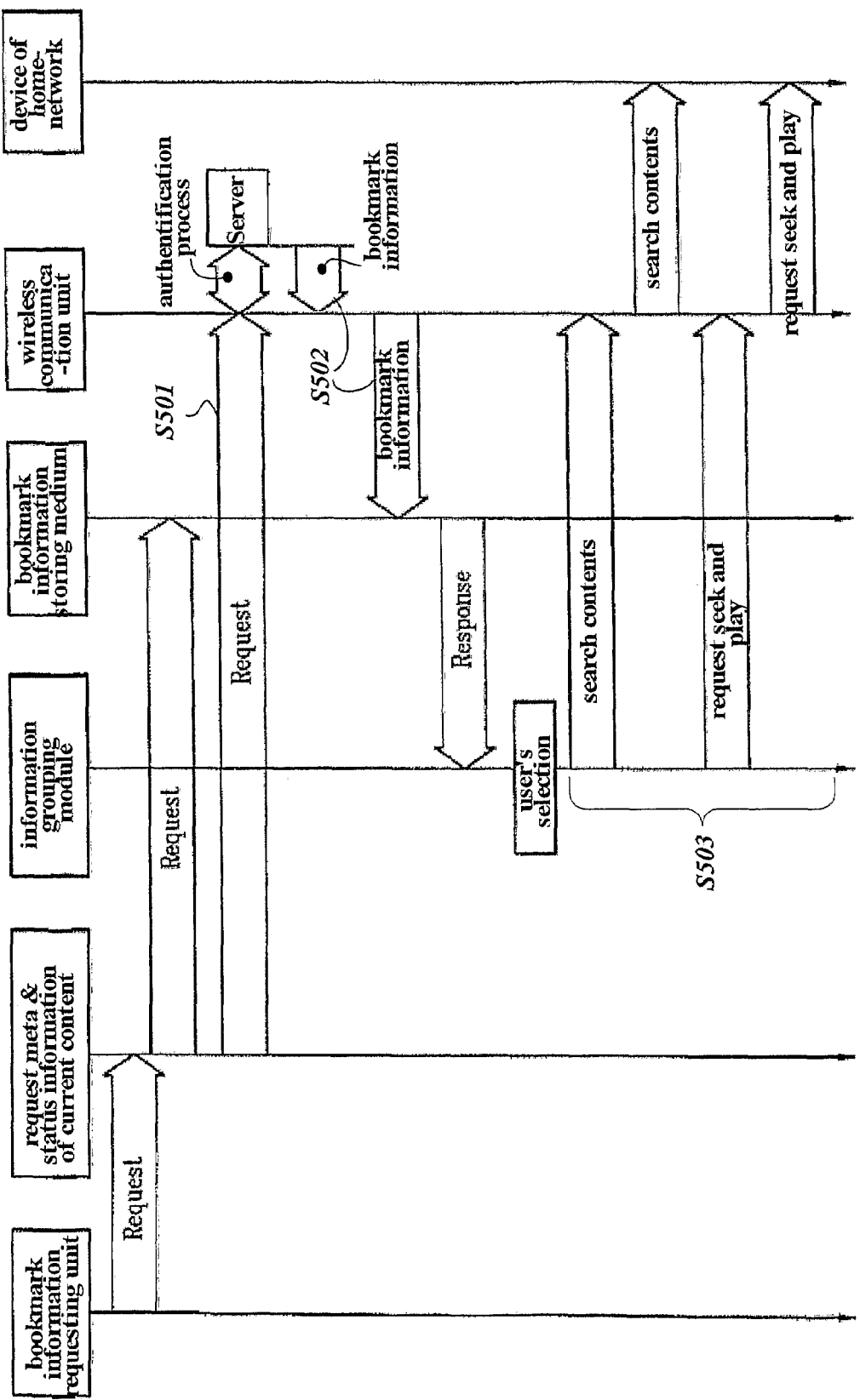

METHOD AND APPARATUS FOR SUPPORTING MOBILITY OF CONTENT BOOKMARK

CROSS-REFERENCE TO RELATED APPLICATIONS

Pursuant to 35 U.S.C. §119(a), this application claims the benefit of earlier filing date and right of priority to Korean Application No. 10-2004-0050693, filed on Jun. 30, 2004, the contents of which are hereby incorporated by reference herein in their entirety.

TECHNICAL FIELD

The present invention relates to a bookmark of media contents, more particularly to method and apparatus for supporting mobility of bookmarks set on media contents.

BACKGROUND ART

As the computing power of small devices improves, various inexpensive and universal networking techniques are appearing and being commercialized.

With the addition of Plug and Play (PnP) capabilities to the PC operating system it became a great deal easier to setup, configure, and add peripherals to a PC. Universal Plug and Play (UPnP) is an extension of the PnP technique to the entire network with a view to enabling discovery and control of networked devices and services, such as network-attached printers, Internet gateways, and consumer electronics equipment. The UPnP is based upon Internet technologies such as TCP/IP, HTTP, and XML.

The UPnP AV architecture defines three main logical entities: a media server (MS), a media renderer (MR), and an AV control point (CP). The media server (MS) has access to entertainment content and can send that content to another UPnP AV device via the network. The media renderer (MR) is able to receive external content from the network and render it on its local hardware. The AV control point (CP) coordinates the operation of the media server (MS) and the media renderer (MR).

In the UPnP architecture, each time a UPnP action such as "browse" action from the AV control point (CP) comes in, the media server (MS) exposes information on its content. The content selected through the user interface of the A/V control point (CP) is transmitted to the media renderer (MR) from the media server (MS) using a streaming technique and played by the media renderer (MR).

The playback of the content stored in the media server (MS) can be stopped by user's request while the content is being played and then resumed afterward. For example, a user may turn off an MP3 player while listening to music and want to resume playing of the music from the stopped position later. Similarly, a user may stop a DVD player while watching a DVD movie and want to resume the movie from the stopped position later. To this end, content players automatically store information on the status of the content being played when power is turned off or playback is stopped. Such a function is called automatic bookmarking.

Generally, bookmarking refers to storing the URL (uniform resource locator) of a web page that you visit using a web browser such as the Netscape navigator so that you can revisit the page easily at a later time. Once the URL of a web page is stored in the bookmark, the user can select the URL from the bookmark to visit the web page without entering the URL.

A user may want to play a content stored in a local network other than his/her own home network. In this case, even if the user played the same content before, it is not possible to resume the playback of the content from the position where the previous playback was stopped because there is no bookmark information stored on the different local network. As a result, the advantage of the bookmarking function is not available in such a case.

DISCLOSURE OF THE INVENTION

In view of the shortcomings of the prior art, it is an object of the present invention to provide a method and apparatus that allows the playback of a content from the position where the previous playback was stopped, independently of the physical location of the content.

The method for playing media contents in accordance with the present invention stores bookmark information in agency means if a bookmark is set on a first media content and plays a second media content identical to the first media content from the position where the bookmark is set on the first media content based on the bookmark information stored in the agency means.

The agency means in accordance with one embodiment of the present invention is a mobile apparatus that has the capability of wireless access to networks and executes a control application for control of devices connected to a home network.

The agency means in accordance with another embodiment of the present invention is an attachable memory that can be attached to arbitrary devices.

The agency means in accordance with yet another embodiment of the present invention is a general-purpose server connected to a local network that can be accessed through a public network.

In one embodiment of the present invention, the first media content and the second media content are separately stored in media servers existing on different local networks.

In one embodiment of the present invention, the bookmark information comprises metadata of the bookmarked media content, information on the status of presentation of the media content, and identification information that is uniquely assigned to the bookmark.

In one embodiment of the present invention, the second media content identical to the first media content is searched based on the content identifier or title contained in the meta data of the bookmark information.

In one embodiment of the present invention, the information on the status of presentation includes status variables for data rendering of the bookmarked media content and status variables for managing data transport points.

In one embodiment of the present invention, the bookmark on the first media content is set automatically on the position where the playback of the first media content is stopped.

In one embodiment of the present invention, the bookmark on the first media content is set on the position of the first media content where user's request is made.

BRIEF DESCRIPTION OF THE DRAWINGS

In the drawings:

FIG. 5 illustrates a signal flow showing the procedure for acquiring bookmark information and for playing a content using the acquired bookmark information in accordance with one embodiment of the present invention.

BEST MODE FOR CARRYING OUT THE INVENTION

In order that the invention may be fully understood, preferred embodiments thereof will now be described with reference to the accompanying drawings.

Figure 1:
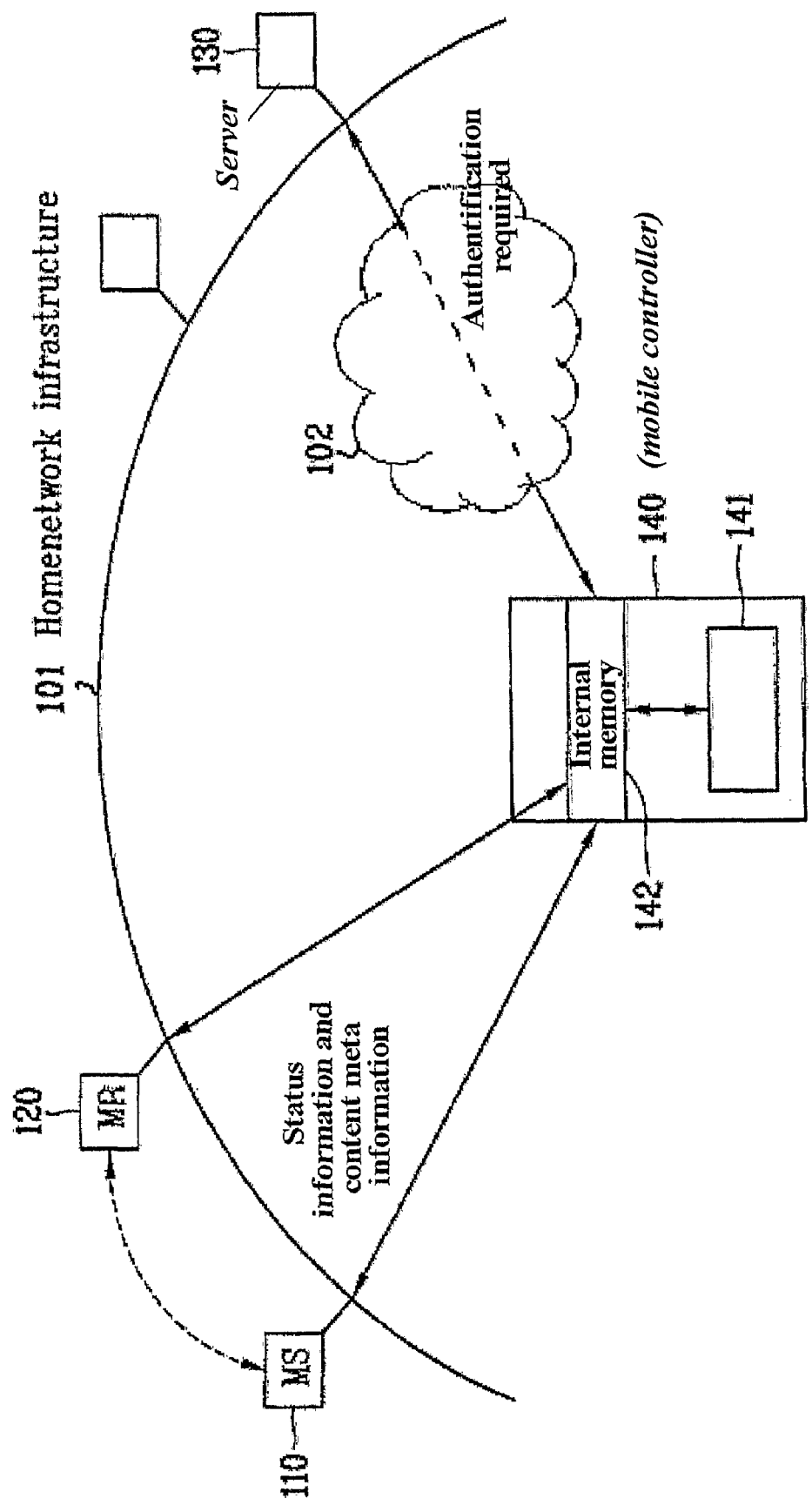
FIG. 1 illustrates a network configuration in which the present invention may be advantageously embodied.

FIG. 1 shows a networked apparatus in which the present invention may be advantageously embodied, comprising a media server (MS) 110, a media renderer (MR) 120, and a general-purpose server 130 that is accessible through public networks.

The apparatus shown in FIG. 1 includes a mobile controller 140 in accordance with one embodiment of the present invention. The mobile controller 140 includes an internal memory 142 wherein status information or meta data of bookmarked contents is stored. An attachable memory 141, (e.g., a USB memory stick or a memory card) can be connected to the mobile controller 140 or the media server (MS) 110 to store the status information or meta data of bookmarked contents.

The mobile controller 140 may be equipped with the function of a control point, which is a control application for status monitoring and/or control of devices connected to the home network such as the media server (MS) 120.

If connected to the home network 101, the mobile controller 140 equipped with the function of a control point discovers devices existing on the home network 101 through the "discovery" function of the UPnP and acquires information on the discovered devices. If the media server (MS) 110 is discovered through the discovery function, the mobile controller 140, responsive to user's request, acquires information on media contents stored in the media server (MS) 110, which are managed as objects in the media server (MS) 110, through "browse" and/or search actions and provides the information to the user.

If a media object and the media renderer (MR) 120 which will play the media object are selected via the mobile controller 140, the mobile controller 140 allows the selected media object to be sent to the media renderer (MR) 120 using a streaming method so that the selected media object can be presented by the media renderer (MR) 120.

To do this, the mobile controller 140 provides status variables for rendering control service (RCS), which are status variables required for data rendering such as sound volume or luminance, and status variables for AV transport service (AVTS), which are status variables required for managing data transmission time such as presentation time to the media renderer (MR) 120. In the case of push mode streaming, the status variables for AV transport service (AVTS) may also be provided to the media server (MS) 110.

If the user needs to move to another network while the selected media content is being streamed, the user makes a request to the mobile controller 140 to stop playing of the media content. Receiving the request, the mobile controller 140 requests "SetAVTransport" action having an input argument for stopping the playback operation to the media server (MS) 110 in the push mode or to the media renderer (MR) 120 in the pull mode and collects the status information and meta data of the media content which has been played. The status information includes the status variables for the rendering control service (RCS) obtained from the media renderer (MR) 120 and the status variables for the AV transport service (AVTS) obtained from the media server (MS) 110 or the media renderer (MR) 120. The media data is obtained from the media server (MS) 110 or obtained by the "browsing" action in advance.

Figure 3:
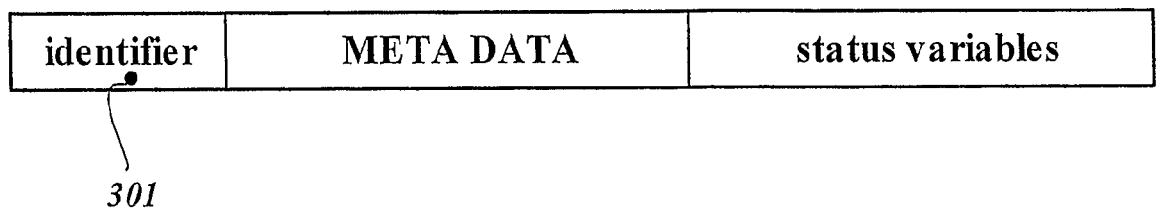
FIG. 3 illustrates the structure of bookmark information created by a bookmarking operation in accordance with one embodiment of the present invention.

If the required information is obtained, the mobile controller 140 stores the information in the internal memory 142 as aggregate information, i.e., bookmark information as shown in FIG. 3. The bookmark information can be copied to or stored in the attachable memory 141 according to user's request.

Instead of automatically creating bookmark information for the position where the playback is stopped, the mobile controller 140 may create bookmark information on the position at which a bookmarking request is made by the user during the playback of the media content by acquiring status variables and meta data as explained before.

The created bookmark information may be stored in a particular container of the media server (MS) 110 or in a particular directory of the general-purpose server 130 by an action of the mobile controller 140.

The bookmark information shown in FIG. 3 includes an identifier 301 (e.g., bookmark ID) for identifying the information. Because the ID of the bookmarked content (object) is contained in the meta data, the bookmark information may be identified by the ID of the bookmarked object. However, if more than one bookmark is set on a media object, it is impossible to identify a specific bookmark only by the ID of the bookmarked object. The bookmark identifier 301 is intended for identifying the bookmark information even in such a case.

The user can select the stored bookmark information from the internal memory 142 while the mobile controller 140 is connected to a local network 102 other than the home network 101. In the case where the bookmark information is stored in the attachable memory 141, the bookmark information may be selected by attaching the attachable memory 141 to the mobile controller 140 or to another device connected to the local network 102. In the latter case, the bookmark information stored in the attachable memory 141 attached to a device is selected by a control point of the local network 102.

It is possible to obtain bookmark information stored in a particular directory of the general-purpose server 130 by connecting to the general-purpose server 130 using an apparatus (e.g., a PDA) equipped with the function of the control point connected to the network 102, rather than using the mobile controller 140 or the attachable memory 142. In this case, the access to the general-purpose server 130 is accompanied by an authentification process. The bookmark information stored in the general-purpose server 130 can be accessed only after successful authentification.

For allowing the user to select bookmark information, a plurality pieces of bookmark information is processed and displayed in a format that can be recognized by the user.

If the user selects particular bookmark information, the mobile controller 140 finds the location of the content on the network 102 based on the meta data of the bookmark and plays the selected content from the position where the previous playback was stopped through the media server and media renderer of the network 102 based on the status information of the bookmark information (e.g., status variables for AVTS).

Unnecessary status information contained in the bookmark information is ignored and unique device numbers (UDNs) of the AV transport service (AVTS) and rendering control service (RCS) of the media server or the media renderer are used after being newly acquired. The URL of the bookmarked media object contained in the meta data is also ignored and the object is searched from the media server existing on the network 102 using the object title or object ID instead.

Figure 2:
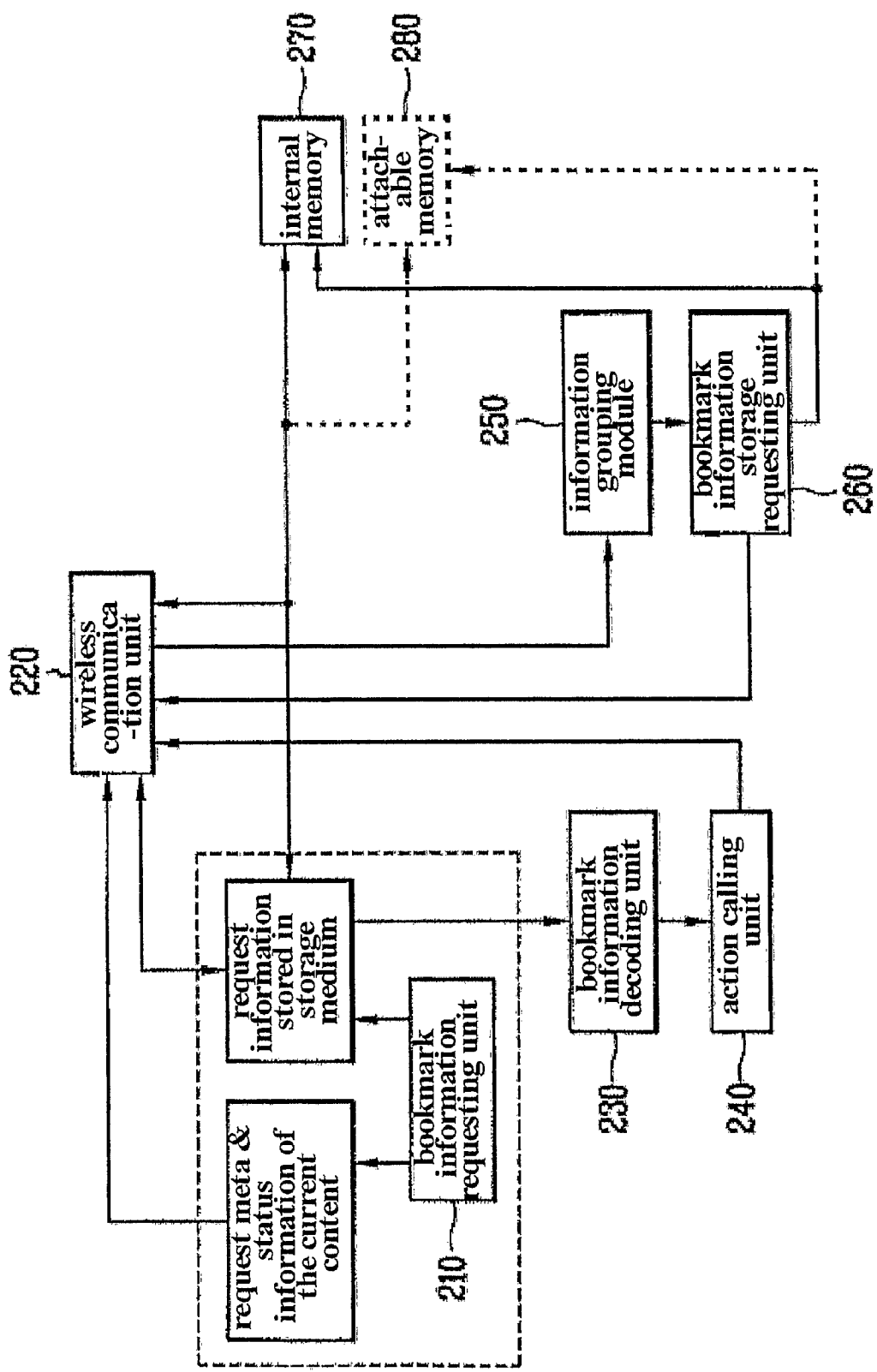
FIG. 2 illustrates a detailed block diagram of the mobile controller shown in FIG. 1.

As shown in FIG. 2, the mobile controller 140 comprises a bookmark information requesting unit 210, a wireless communication unit 220, a bookmark information decoding unit 230, an action calling unit 240, an information grouping module 250, a bookmark information storage requesting unit 260, and an internal memory 270. An optional attachable memory 280 may be included therein.

The procedure for storing bookmark information and playing a media content by acquiring the stored bookmark information will now be described in detail.

Figure 4:
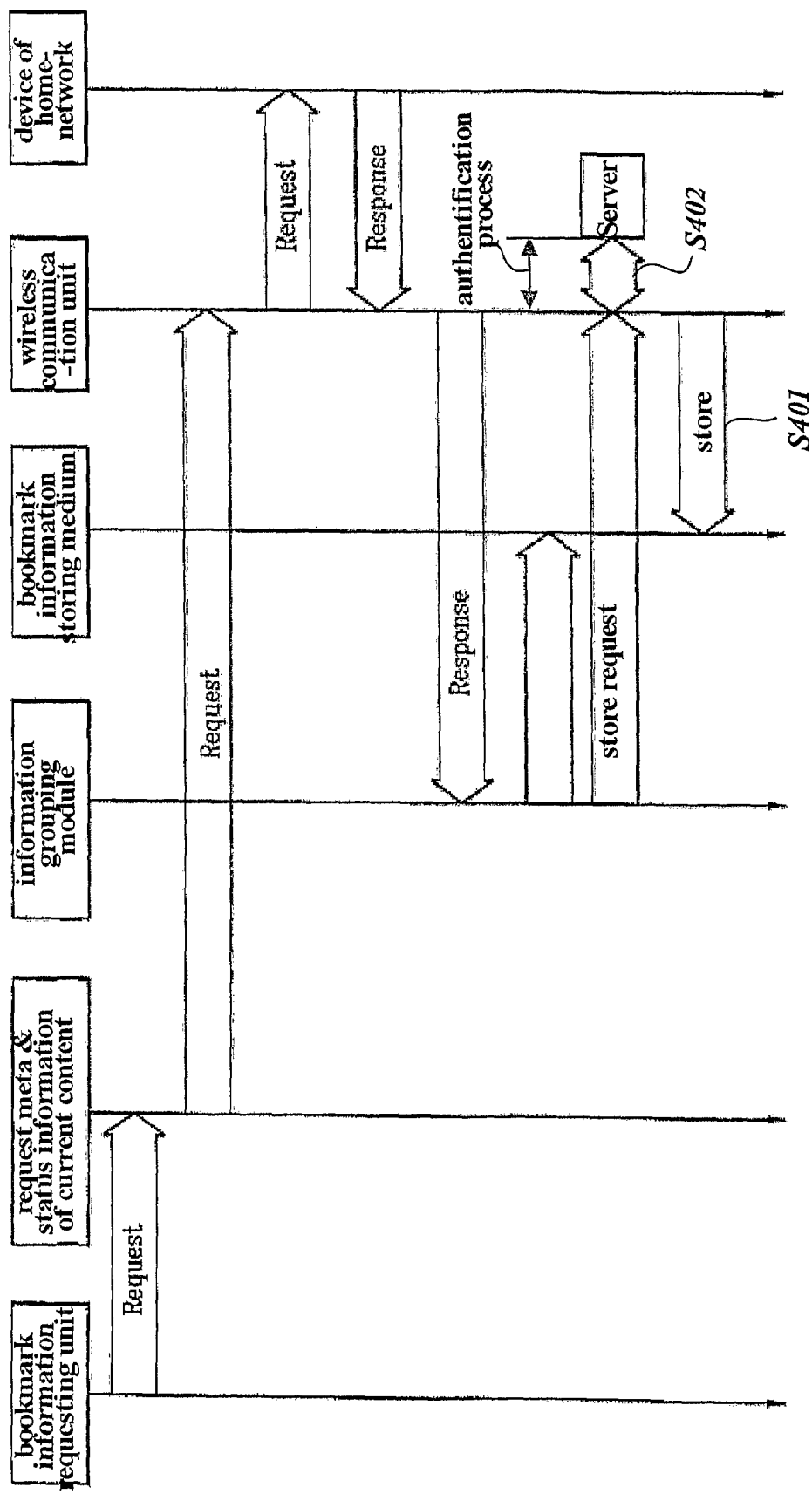
FIG. 4 illustrates a signal flow showing the procedure for creating bookmark information for a content in accordance with one embodiment of the present invention.

FIG. 4 is a signal flow for obtaining information on a content that is being played and creating bookmark information for the content.

In response to user s request for bookmarking or stopping playback, the bookmark information requesting unit 210 makes a request for status information and meta data of the content being presented to the wireless communication unit 220.

The input parameters of the action for acquiring the status information and meta data of the content include the object ID (ObjectID) specifying the object, the instance IDs (InstanceID) of the RCS and AVTS that present the data being streamed, and a list of relevant status information. The output parameters of the action include a list of status information having status variables, the meta data of the object, the position information of content streaming related to the instance ID (InstanceID).

The wireless communication unit 220 transmits the received status information and meta data to the information grouping module 250 which creates aggregate information, i.e., bookmark information as shown in FIG. 3 from the status information and meta data. The reason that the bookmark information is made to be aggregate information is because the status information and meta data are not a single value but text-based information. To help the user recognize the bookmark that he/she wants, a user-recognizable identifier, i.e., a bookmark ID, is added to the aggregate information. The ID of the bookmarked object or a part of the title may be automatically assigned as the bookmark ID. Alternatively, the user may be requested to enter a character string to be used as the bookmark ID. In this case, an additional serial number is automatically added to the character string to prevent IDs from having the same value.

The bookmark information storage requesting unit 260 determines which storage medium will store the received status information and meta data. The bookmark information is stored in the internal memory 270 or in the attachable memory 280 (S401) or in the general-purpose server 130 through the wireless communication unit 220 (S402).

FIG. 5 is a signal flow for finding the same content in another network and resuming the playback of the content using the stored bookmark information.

The user makes a request for the list of bookmark information stored in the internal memory 270 or the attachable memory 280 through the bookmark information requesting unit 210 after connecting the mobile controller 140 to the network 102 and acquires the bookmark information. The user may make a request for the bookmark information stored in the general-purpose server 130 existing on his/her own home network 101 through the different network 102 (S501) and acquire the bookmark information stored in the general-purpose server 130 (S502). In this case, it is necessary to go through an authentification process to access the general-purpose server 130.

The bookmark information decoding unit 230 converts the obtained bookmark information into data that the user can recognize and displays the data through user interface so that the user can select a bookmark associated with a desired content.

If the user selects a bookmark, the action calling unit 240 requests "search" action for searching for the content associated with the selected bookmark, "seek" action for setting the playback start point where the previous playback was stopped on the selected media object, and "play" action for starting data streaming from the set position sequentially to the media server and/or media renderer of the network 102 to play the selected content (S503)

The present invention allows the playback of a content to be started from a position where the previous playback was stopped independently of the physical location of the content, thereby providing improved user interface and convenience.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A method for playing a media object, the method comprising:
   storing bookmark information in a storage apparatus if a bookmark is set on a first media object; and
   playing a second media object from a position where the bookmark is set on the first media object, according to the bookmark information stored in the storage apparatus, the second media object having content similar to the first media object, and a first media device of the first media object being different from a second media device of the second media object, wherein the bookmark information comprises information on status of presentation of the bookmarked media object, an identifier and a title of the bookmarked media object, and identification information that is uniquely assigned to the bookmark, the information on the status of presentation comprising values of status variables used for data rendering of the bookmarked media object and values of status variables used for controlling data transport between devices.

2. The method set forth in claim 1, wherein the storage apparatus is at least one of a wireless mobile apparatus, an attachable memory device, or a local area network sever.

3. The method set forth in claim 1, wherein the first media object and the second media object are stored in different storage apparatus located on different local networks.

4. The method set forth in claim 1, wherein the bookmark information further comprises metadata of the bookmarked media object.

5. The method set forth in claim 1, wherein playing the second media object further comprises finding the second media object from a plurality of media objects, based on the identifier or the title contained in the bookmark information.

6. The method set forth in claim 1, wherein playing the second media object further comprises sequentially requesting an action for setting the bookmark-set position to a position where streaming of the second media object starts and a play action for starting the streaming to an apparatus in which the second media object is stored and an apparatus that will render data of the second media object.

7. The method set forth in claim 1, wherein the bookmark on the first media object is set automatically on a position where playback of the first media object is stopped.

8. The method set forth in claim 1, wherein the bookmark on the first media object is set on a position of the first media object where a user's request is made.

9. An apparatus for playing content, the apparatus comprising:
a processor configured to access a second device and playing a second media object stored in the second device, according to information on a bookmark stored in storage device, from a position where the bookmark is set on a first media object stored in a first device,
the bookmark stored in the storage device being created in connection with playback of the first media object, the second media object having content similar to the first media object, the second device being different from the first device,
wherein the information on the bookmark comprises information on status being set when the first media object is bookmarked, an identifier and a title of the bookmarked first media object, and identification information that is uniquely assigned to the bookmark, the information on the status including values of state variables used for controlling data rendering of the first media object and values of state variables used for controlling data transport between devices.

10. The apparatus set forth in claim 9, wherein the storage device comprises at least one of a wireless mobile apparatus, a detachable memory apparatus, or a local area network server.

11. The apparatus set forth in claim 9, wherein the second device is connected to a second local network and the first device is connected to a first local network separated from the second local network.

12. The apparatus set forth in claim 9, wherein the information of the bookmark further comprises metadata of the first media object that is bookmarked.

13. The apparatus set forth in claim 9, wherein the processor is further configured to find the second media object from a plurality of media objects, based on the identifier or the title comprised in the information of the bookmark.

14. The apparatus set forth in claim 13, wherein the processor is further configured to:
set a bookmarked position included in the information of the bookmark to a position from which the found second media object staffs to be streamed; and
start to render data of the second media object that is streamed from the second device in response to a received play action.

15. The apparatus set forth in claim 9, wherein the bookmark is automatically created to include a stopped position when playback of the first media object is stopped.

16. The apparatus set forth in claim 9, wherein the bookmark is created to include a position on the first media object where bookmarking is requested from a user.

\* \* \* \* \*